UNITED STATES PATENT OFFICE.

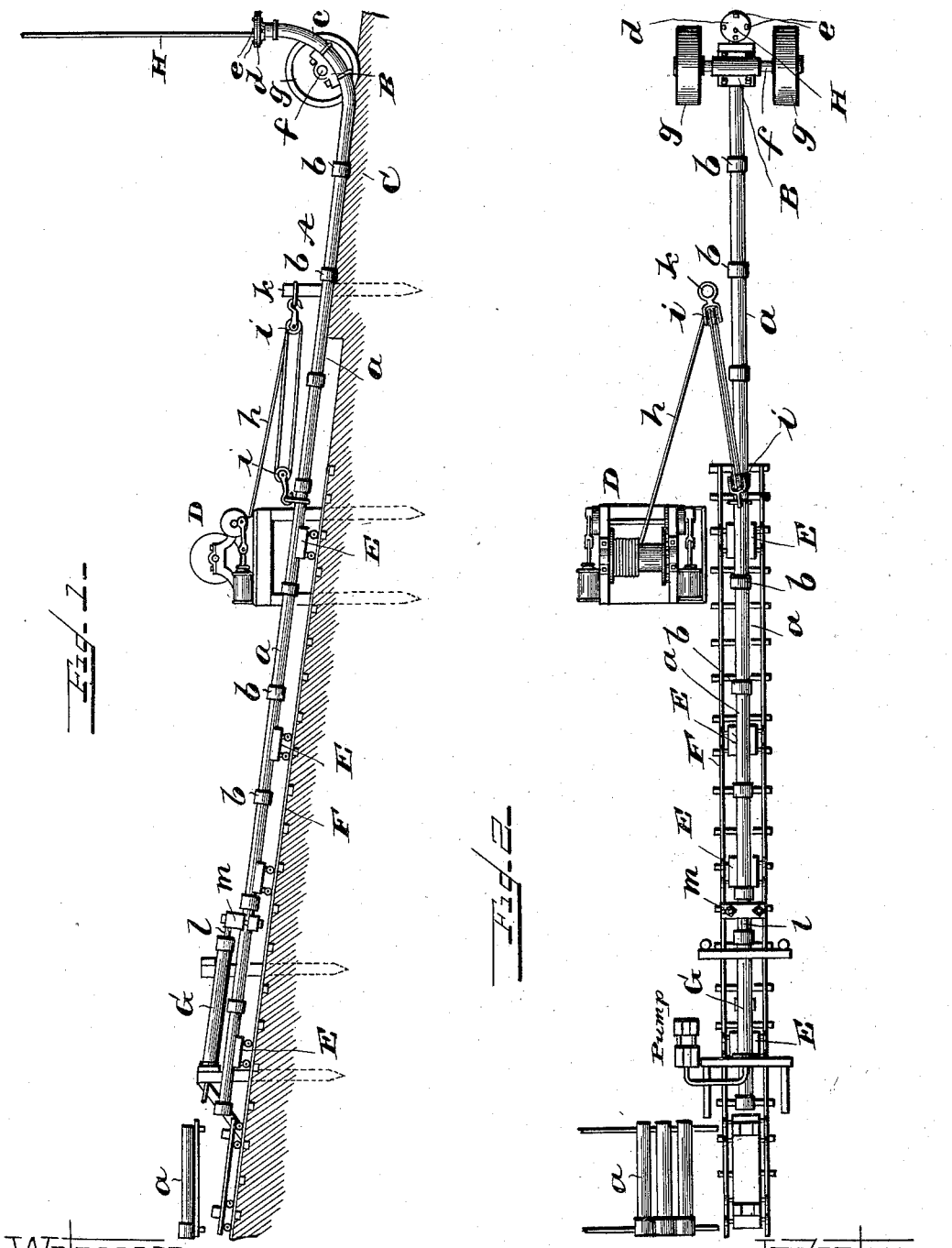

EDWIN K. CONOVER, OF NEWARK, NEW JERSEY.

METHOD OF AND MEANS FOR LAYING SUBMERGED PIPES.

SPECIFICATION forming part of Letters Patent No. 612,485, dated October 18, 1898.

Application filed December 8, 1897. Renewed September 16, 1898. Serial No. 691,088. (No model.)

*To all whom it may concern:*

Be it known that I, EDWIN K. CONOVER, a citizen of the United States, residing at Newark, in the county of Essex and State of New Jersey, have invented certain new and useful Improvements in Methods of and Means for Laying Submerged Pipes; and I do hereby declare the following to be a full, clear, and exact description of the invention, such as will enable others skilled in the art to which it appertains to make and use the same.

My invention relates to sewer or other conduits for conducting sewage from shore into a body of water and discharging the sewage at a point so far from shore that it shall not be washed in by waves or tide, has especial reference to laying the pipe or conduit under water, and consists in certain improvements which will be fully disclosed in the following specification and claims.

In the accompanying drawings, which form part of this specification, Figure 1 represents a side elevation of my invention, and Fig. 2 a top plan view of the same.

Reference being had to the drawings and the letters thereon, A indicates a pipe or conduit made in sections $a$, connected by couplings $b$ in the usual manner of securing screw-threaded pipe. The end or front section is upturned or bent at $c$, provided with a detachable cover $d$, which is secured in position by suitable bolts $e$ while the pipe or conduit is being placed in position, to prevent the pipe filling with water, and thereby greatly augmenting its weight and preventing the escape of water which is introduced from time to time while the pipe is being projected out into a body of water to form ballast to weight the pipe down upon the bottom.

B indicates a saddle secured to the pipe adjacent to the outer end, provided with an axle $f$, having wheels $g$ $g$ secured thereon, so that the bearing-surface of this support formed by the wheels shall be in a plane approximately coincident with the lower surface of the pipe or conduit A, so that it shall bear upon or slightly embed in the bottom C and form a sure and firm support for the pipe and prevent injury thereto by waves or billows or washouts or natural depressions or recesses in the bottom. The wheels $g$ $g$ are preferably about five feet in diameter, about eight feet apart, and twelve inches across the face or tread of the wheel and are so attached to the pipe that the bearing-surface of the axle is preferably across the upper side of the saddle.

The pipe is projected or pushed out into the water by means of a suitable primary motor D, such as a hoisting-engine, which is connected to the pipe by a rope $h$ and suitable pulleys $i$, forming an ordinary block and tackle, one of the blocks or pulleys being secured to a pile $k$, driven into the beach, and the other secured to the pipe.

The sections $a$ of the pipe are supplied successively and a portion of the conduit supported upon suitable trucks E, which travel upon a railway F, and when the conduit becomes so long and heavy that the motor D can no longer push it out into the water a secondary motor G, such as a hydraulic jack, is applied, with the end of its piston-rod $l$ bearing against a clamp $m$, secured to the conduit, and the two motors used for the purpose.

As the work of projecting the pipe or conduit A out into the water progresses the trucks E are moved back and the connection of the block and tackle with the pipe and the clamp $m$ changed as required.

The support on the end of the pipe forms a guide thereto and directs the pipe in a straight line from the shore, and to the pipe is attached a pole or signal H to indicate to the workmen on shore the position or whereabouts of the end of the pipe, and after the pipe or conduit has been pushed or projected out into a body of water a predetermined distance the cover $d$ is removed by a diver, and the conduit is ready for service. The signal H may also be removed to prevent forming an obstruction to passing vessels, or it may be permitted to remain to prevent vessels running against the conduit.

Having thus fully described my invention, what I claim is—

1. The improvement in the art of laying submerged pipe, which consists in supporting the pipe upon the bed or bottom of a body of water, projecting the pipe from shore and supplying liquid to the pipe from the shore end as the length of pipe is increased.

2. A sewer or other pipe having an upturned end and provided with a revoluble support adjacent to said end, in combination with means for projecting the pipe from shore into a body of water.

3. A sewer or other pipe having an upturned end and provided with a revoluble support substantially in line with the lower surface of the pipe, in combination with means for projecting the pipe from shore into a body of water.

4. A sewer or other pipe having a revoluble support and a signal at its front end, in combination with means for projecting the pipe from shore into a body of water.

5. A sewer or other pipe having an upturned end provided with a detachable cover and a revoluble support permanently secured thereto in combination with means for projecting the pipe from shore into a body of water.

6. A sewer or other pipe having a revoluble support at its front end, in combination with means for projecting the pipe from shore into a body of water and suitable ballast for weighting the pipe.

7. A sewer or other pipe having an upturned end and a revoluble support secured to said end, in combination with a primary and a secondary motor connected to the pipe.

In testimony whereof I affix my signature in presence of two witnesses.

EDWIN K. CONOVER.

Witnesses:
 OROSCO C. WOOLSON,
 C. A. VAN DERVEER.